July 14, 1970  B. E. RESENER  3,520,151

ROLLER CHAIN COUPLING

Filed Jan. 13, 1969

INVENTOR.
BAIRD E. RESENER
BY
ATTYS 3,520,151
ROLLER CHAIN COUPLING
Baird Eugene Resener, Indianapolis, Ind., assignor to AMSTED Industries Incorporated, Chicago, Ill., a corporation of Delaware
Filed Jan. 13, 1969, Ser. No. 790,659
Int. Cl. F16d 3/54
U.S. Cl. 64—19       5 Claims

ABSTRACT OF THE DISCLOSURE

A coupling for substantially coaxial shafts utilizing a double strand chain wrapped around a sprocket mounted on each of the shafts includes a roller chain having rollers of nonmetallic resilient material of high abrasion resistance, which has been found to greatly reduce wear on the sprocket teeth.

---

This invention relates to roller chain couplings and more particularly to an improved roller chain for use in such couplings.

Mechanical power transmission shafts are commonly connected by chain couplings, typically comprising a sprocket on each of two substantially aligned shafts and a steel double strand roller chain wrapped around and interconnecting the sprockets. In the operation of such a coupling utilizing steel roller chain, misalignment between the shafts imposes a diametrically opposed load on only two points of the chain, thereby creating high concentrated stresses in the affected steel rollers and resulting in very rapid wear of the sprockets. In order to overcome this difficulty and improve service life, the affected chain parts and sprocket teeth are hardened, and a sealed housing containing lubricant is provided to enclose the coupling parts. The use of sealed housings, however, is expensive and inconvenient, and they are often omitted by users to the detriment of the coupling.

Accordingly, an object of this invention is to reduce wear in a roller chain coupling and eliminate the need for a lubricant housing in many applications.

Figure 1:
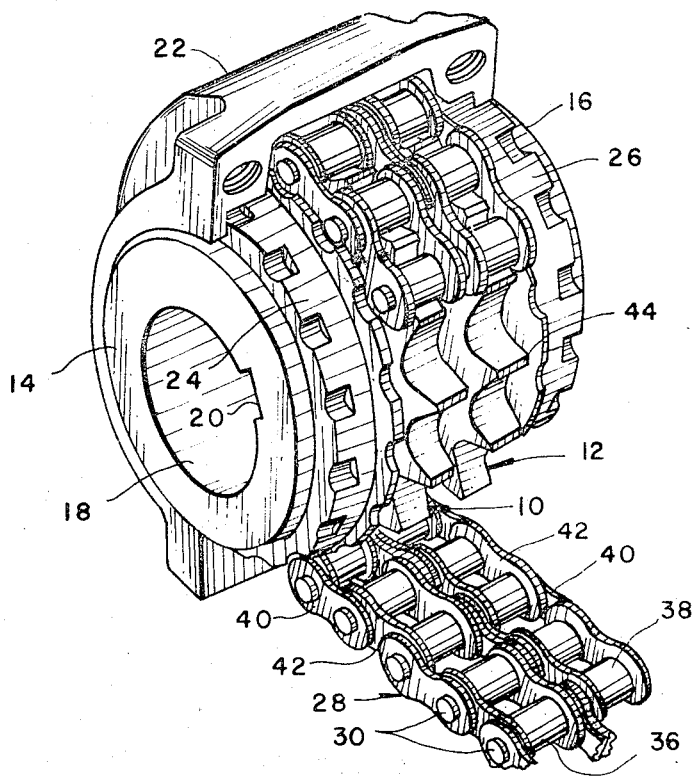
Figure 2:
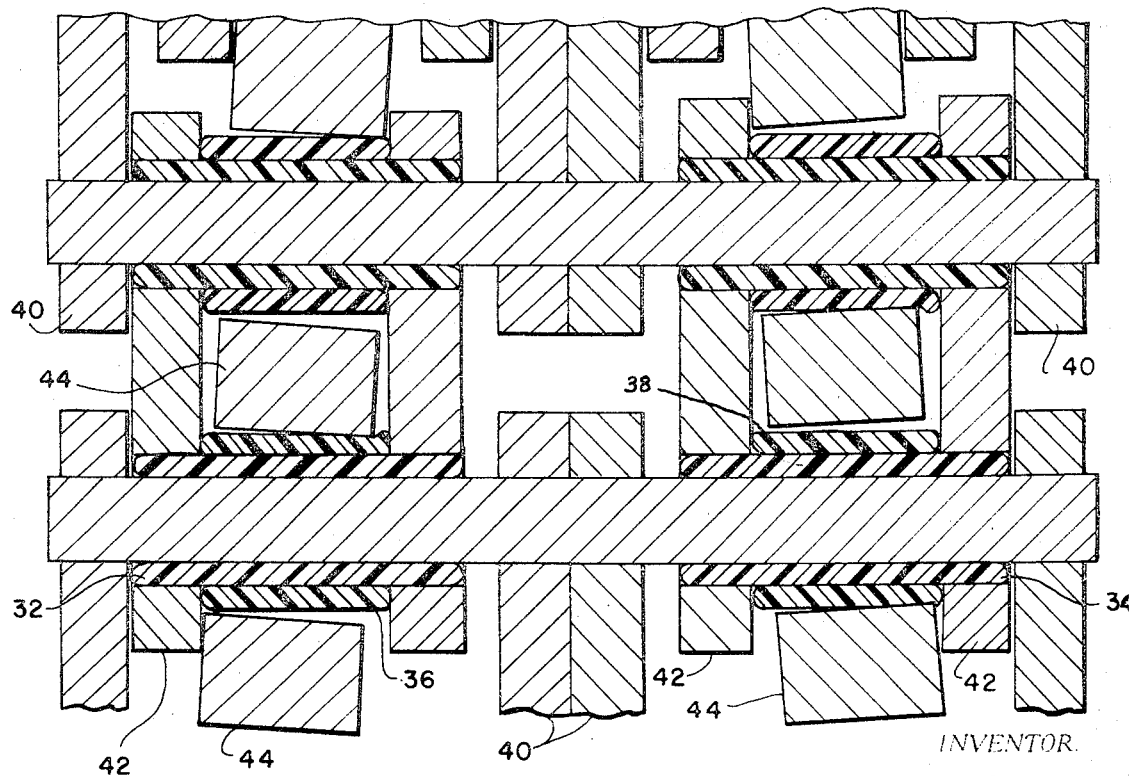

Other objects will become apparent from the following description and claims, taken in connection with the accompanying drawing wherein:

FIG. 1 is a perspective view of a roller chain coupling, shown with the chain partially unwrapped, which may incorporate features of the presently described invention; and FIG. 2 is a cross sectional fragmentary view of the chain, showing deflection of the rollers thereof under exaggerated misalignment conditions.

With more particular reference to FIG. 1, the coupling device comprises a pair of substantially identical sprockets 10 and 12 secured to respective hubs 14 and 16, having bores and keyways, such as 18 and 20, respectively, for receiving a shaft (not shown). The sprockets 10 and 12 may be enclosed in a housing 22, and seals 24 and 26 may be fitted around respective hubs 14 and 16 in sliding engagement with the interior of the housing, in order to provide a sealed enclosure.

As shown in FIGS. 1 and 2, the sprockets 10 and 12 are interconnected by a double strand steel chain 28 comprising a plurality of pins 30 each having two spaced cylindrical bushings 32 and 34 (FIG. 2) rotatably mounted thereon and rotatably supporting respective overlying rollers 36 and 38. The pins 30 are pivotally interconnected by outside pin link plates 40, and roller link plates 42 are pivotally connected between alternate pins around the bushings 32 and 34 inwardly of the pin link plates 40. The teeth 44 of respective sprockets 10 and 12 are received between the respective rollers 36 and 38 in each strand of the chain in the conventional manner.

In accordance with the present invention, it has been found that rollers, such as 36 and 38, constructed from certain flexible nonmetallic materials and incorporated into the chain, result in highly improved performance and greatly reduce wear of the sprocket teeth. The nonmetallic rollers are constructed to have the same dimensions as the conventional steel rollers they replace and are preferably composed of a material having relatively high abrasion resistance, such as polyurethane, which may be compounded with molybdenum disulfide or graphite. Fluoroelastomers, high molecular weight polyethylene and other similar flexible materials having high abrasion resistance and reasonable strength may be employed with beneficial results.

FIG. 2 shows the action of the nonmetallic rollers when the coupling is misaligned. The rollers 36 and 38 deflect sufficiently to more evenly distribute the load on the sprockets, thereby providing for lower torsional rigidity. Most importantly, however, the use of such rollers, because of their natural lubricating effect, greatly reduces the wearing away of the sprocket teeth.

Having thus described the invention, what is claimed is:

1. In combination, a roller chain coupling having an opposed pair of sprockets secured to separate substantially aligned shafts, and a double strand roller chain wrapped around and interconnecting said sprockets, said roller chain having rollers composed of a nonmetallic flexible material having high abrasion resistance.

2. The invention according to claim 1 wherein said material is polyurethane.

3. The invention according to claim 1 wherein said material is polyurethane compounded with molybdenum disulfide or graphite.

4. The invention according to claim 1 wherein said material is a fluoroelastomer.

5. The invention according to claim 1 wherein said material is a high molecular weight polyethylene.

References Cited

UNITED STATES PATENTS

| 3,055,195 | 9/1962 | Olson | 64—11 |
| 3,167,935 | 2/1965 | Fawick | 64—19 |

FOREIGN PATENTS

| 872,550 | 7/1961 | Great Britain. |

JAMES A. WONG, Primary Examiner